(12) United States Patent
Choi et al.

(10) Patent No.: US 9,458,377 B2
(45) Date of Patent: Oct. 4, 2016

(54) RED PHOSPHOR, WHITE LIGHT EMITTING DEVICE, DISPLAY APPARATUS AND ILLUMINATION APPARATUS

(71) Applicant: SAMSUNG ELECTRONICS CO., LTD., Gyeonggi-do (KR)

(72) Inventors: Sung Woo Choi, Gyeonggi-do (KR); Chul Soo Yoon, Gyeonggi-do (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 136 days.

(21) Appl. No.: 14/220,894

(22) Filed: Mar. 20, 2014

(65) Prior Publication Data

US 2014/0376259 A1    Dec. 25, 2014

(30) Foreign Application Priority Data

Jun. 20, 2013   (KR) .................. 10-2013-0070991

(51) Int. Cl.
| | |
|---|---|
| *C09K 11/71* | (2006.01) |
| *F21K 99/00* | (2016.01) |
| *F21V 8/00* | (2006.01) |
| *C09K 11/77* | (2006.01) |

(52) U.S. Cl.
CPC ........... *C09K 11/7728* (2013.01); *G02B 6/005* (2013.01); *G02B 6/0023* (2013.01); *Y02B 20/181* (2013.01); *Y10T 428/2982* (2015.01)

(58) Field of Classification Search
CPC .......... C09K 11/0883; C09K 11/7734; H01L 33/502; H01L 33/504; G02F 1/133614
See application file for complete search history.

(56) References Cited

U.S. PATENT DOCUMENTS

| | | | |
|---|---|---|---|
| 7,273,568 B2 | 9/2007 | Nagatomi et al. | |
| 7,854,859 B2 | 12/2010 | Kameshima et al. | |
| 8,119,028 B2 | 2/2012 | Le Toquin | |
| 8,153,025 B2* | 4/2012 | Schmidt ............. | C09K 11/7706 252/301.4 R |
| 2006/0197439 A1 | 9/2006 | Sakane et al. | |
| 2008/0150412 A1 | 6/2008 | Yoshimatsu | |
| 2009/0250663 A1 | 10/2009 | Oshio | |
| 2010/0133469 A1 | 6/2010 | Schmidt et al. | |
| 2011/0176084 A1 | 7/2011 | Akiho et al. | |
| 2011/0182085 A1* | 7/2011 | Ko ............................ | F21K 9/00 362/612 |
| 2011/0211336 A1* | 9/2011 | Oshio ....................... | F21K 9/00 362/97.1 |
| 2012/0306353 A1 | 12/2012 | Tanaka et al. | |
| 2012/0306356 A1 | 12/2012 | Yoon et al. | |
| 2013/0127333 A1* | 5/2013 | Jia ...................... | C09K 11/7731 313/503 |

FOREIGN PATENT DOCUMENTS

| | | |
|---|---|---|
| JP | 4228012 B2 | 2/2009 |
| JP | 2009-132916 A | 6/2009 |
| JP | 2010-010379 A | 1/2010 |
| KR | 10-1039264 B1 | 6/2011 |
| KR | 10-1077990 B1 | 10/2011 |

OTHER PUBLICATIONS

Jian Ruan, et al.;, "Nitrogen Gas Pressure Synthesis and Photoluminescent Properties of Orange-Red SrAlSi4N7:Eu2+Phosphors for White Light-Emitting Diodes"; Journal of the American Ceramic Society, vol. 94, Issue 2, <http://onlinelibrary.wiley.com/doi/10.1111/jace.2011.94.issue-2/issuetoc>pp. 536-542, Feb. 2011.

Cora Hecht, et al., "SrAlSi4N7:Eu2+ A Nitridoalumosilicate Phosphor for Warm White Light (pc)LEDs with Edge Sharing Tetrahedra;" Chem. Mater., 2009, 21 (8), pp. 1595-1601.

* cited by examiner

*Primary Examiner* — Carol M Koslow

(74) *Attorney, Agent, or Firm* — F. Chau & Associates, LLC

(57) ABSTRACT

A red phosphor includes a nitride represented by an empirical formula of $Sr_{1-x-y}Ba_xEu_yAlSi_4N_7$. A composition ratio (x) of barium (Ba) satisfies $0<x\leq0.3$ and a composition ratio (y) of europium (Eu) satisfies $0\leq y\leq 0.1$.

19 Claims, 13 Drawing Sheets

RED PHOSPHOR, WHITE LIGHT EMITTING DEVICE, DISPLAY APPARATUS AND ILLUMINATION APPARATUS

CROSS-REFERENCE TO RELATED APPLICATION

This application claims priority to, and benefit of, Korean Patent Application No. 10-2013-0070991 filed on Jun. 20, 2013, with the Korean Intellectual Property Office, the entire contents of which are hereby incorporated by reference.

TECHNICAL FIELD

The present disclosure relates to a red phosphor, and more particularly, to a phosphor having high light emission characteristics and excellent thermal and structural stability. The present disclosure also relates to a white light emitting device, a display apparatus and an illumination apparatus using the same.

BACKGROUND

In general, a phosphor wavelength conversion material has been used as a material converting light having a certain wavelength emitted by various light sources into light having a desired wavelength. In particular, among various light sources, light emitting diodes (LEDs) are able to be driven with low power consumption and have excellent light efficiency, and thus may be effectively applied to liquid crystal display (LCD) backlight units, vehicle lighting systems, and home lighting systems. Recently, phosphor materials have been recognized as a core technology of the manufacturing of white light emitting devices.

White light emitting devices have been generally manufactured in a scheme in which at least one or more types of phosphor, for example, a yellow or red phosphor and a blue phosphor, are applied to a blue or ultraviolet LED chip. Such phosphors are required to have excellent thermal stability with relatively high light emission characteristics.

Here, as a red phosphor, red phosphors such as a sulfide-based or oxide-based phosphors or a nitride-based phosphor may be mainly used. In such red phosphors, e.g., sulfide-based and oxide-based phosphors, a phenomenon in which color is changed when driven for a long period of time may occur due to these phosphors having relatively low thermal and structural stability. Such a phenomenon may be severe in the field of illumination using high output LEDs.

SUMMARY

An aspect of an embodiment provides a red phosphor having relatively excellent thermal stability to maintain properties thereof in a high temperature environment while having relatively high light emission characteristics.

An aspect of the present inventive concept relates to a red phosphor including a nitride represented by an empirical formula $Sr_{1-x-y}Ba_xEu_yAlSi_4N_7$, wherein a composition ratio (x) of Ba satisfies $0<x\leq0.3$ and a composition ratio (y) of Eu satisfies $0<y\leq0.1$.

The red phosphor may be configured to emit light having a peak wavelength ranging from 600 to 660 nm, when an excitation light irradiates onto the red phosphor. Internal quantum efficiency of the red phosphor may be 80% or more. A half-width of the red phosphor may be 110 nm or below.

The red phosphor may further include oxygen of 0.5 wt % or less as an impurity. The red phosphor may further include at least one metal selected from Fe, Co and Ni, as an impurity, in an amount of 50 ppm or less.

The red phosphor may have a grain size d50 satisfying $7\ \mu m \leq d50 \leq 25\ \mu m$.

Another aspect of the inventive concept encompasses a white light emitting device including a semiconductor light emitting device configured to emit excitation light, the red phosphor, disposed in the vicinity of the semiconductor light emitting device to convert a wavelength of at least a portion of the excitation light, and at least one light emitting element configured to emit light having a wavelength different from an emission wavelength of the semiconductor light emitting device and an emission wavelength of the red phosphor, wherein the at least one light emitting element is at least one of an additional semiconductor light emitting device and a different type of phosphor.

The semiconductor light emitting device may be a blue semiconductor light emitting device having a peak wavelength ranging from 430 nm to 470 nm, and the at least one light emitting element may include a green or yellow phosphor.

A light emission wavelength peak of the red phosphor may range from 600 nm to 650 nm, a light emission wavelength peak of the green phosphor may range from 500 nm to 550 nm, and a light emission wavelength peak of the yellow phosphor may range from 550 nm to 580 nm.

The green phosphor may include at least one of an oxide phosphor represented by an empirical formula of $M_3Al_5O_{12}$, an oxynitride phosphor, a β-sialon phosphor and a phosphor of $La_3Si_6N_{11}$:Ce, wherein M is at least one group II or III element selected from Y, Lu, Gd, Ga, Be, Mg, Ca, Sr, Ba, Zn, Eu, and Ce, and A is at least one group IV element selected from C, Si, Ge, Sn, Ti, Zr and Hf.

The at least one light emitting element may further include a yellow or yellowish-orange phosphor. The yellow phosphor may be at least one of a silicate-based phosphor, a garnet-based phosphor and a nitride-based phosphor, and the yellowish-orange phosphor may be a phosphor of α-SiAlON:Re.

An aspect of the present inventive concept relates to an illumination apparatus including an LED light source and the red phosphor.

Another aspect of the present inventive concept relates to a display device including an LED light source and the red phosphor.

Still another aspect of the present inventive concept encompasses a backlight unit that includes an LED light source and a phosphor film. The phosphor film includes a nitride represented by an empirical formula of $Sr_{1-x-y}Ba_xEu_yAlSi_4N_7$. A composition ratio (x) of barium (Ba) satisfies $0<x\leq0.3$ and a composition ratio (y) of europium (Eu) satisfies $0<y\leq0.1$.

The backlight unit may further includes a light source module including the LED light source, and a bottom case receiving the light source module. The phosphor film may be disposed on an upper surface of the bottom case.

The backlight unit may further include a light guide plate. The LED light source may be disposed on one side of the light guide plate.

The phosphor film may be interposed between a side of the light guide plate and the LED light source.

The phosphor film may be disposed on a light emission surface of the light guide plate.

BRIEF DESCRIPTION OF THE DRAWINGS

The above and other aspects, features and other advantages will be more clearly understood from the following detailed description taken in conjunction with the accompanying drawings, in which like reference characters may refer to the same or similar parts throughout the different views. The drawings are not necessarily to scale, emphasis instead being placed upon illustrating the principles of the embodiments of the present inventive concept. In the drawings, the thickness of layers and regions may be exaggerated for clarity.

DETAILED DESCRIPTION

Figure 1:
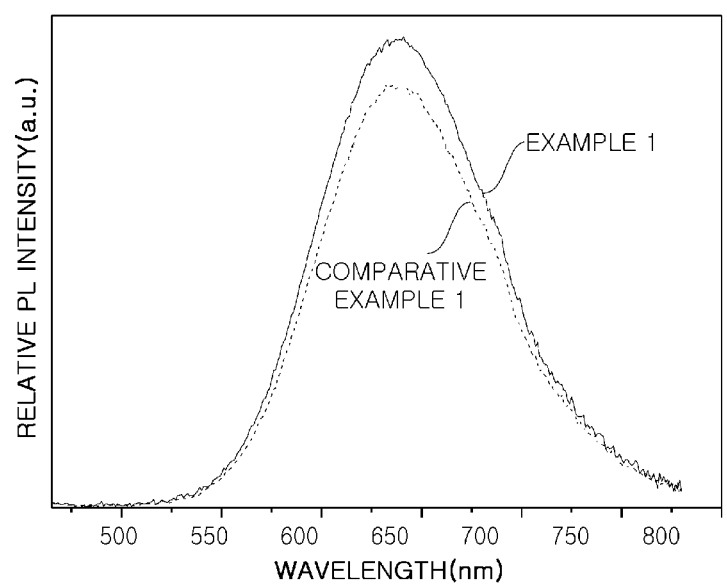
FIG. 1 is a graph illustrating results obtained by measuring brightness of a red phosphor according to an inventive example (example 1) and a comparative example 1.

Hereinafter, embodiments of the present inventive concept will be described in detail with reference to the accompanying drawings. The inventive concept may, however, be embodied in many different forms and should not be construed as being limited to the embodiments set forth herein. Rather, these embodiments of the inventive concept are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

According to an embodiment of the inventive concept, in a basic composition of a red phosphor including a nitride represented by an empirical formula of $SrAlSi_4N_7:Eu^{2+}$, brightness characteristics may be improved by partially substituting a strontium (Sr) site with Ba. That is, the substitution of Ba may be performed within an appropriate range such that brightness may be improved together with movement of a peak wavelength. In this case, brightness may be improved, for example, by 10% or above, as compared to a nitride phosphor in which Sr is used alone. In addition, endurability at a relatively high temperature may be enhanced.

The red phosphor may be a nitride phosphor represented by an empirical formula of $Sr_{1-x-y}Ba_xEu_yAlSi_4N_7$. In this empirical formula, a composition ratio (x) of Ba may satisfy $0 < x \leq 0.3$ and a composition ratio (y) of Eu may satisfy $0 < y \leq 0.1$. Here, a light source wavelength may be ultraviolet light or blue light, and a wavelength band may range from 300 nm to 480 nm. For example, as a light source for optical pumping, blue wavelength light of 430 nm~470 nm may be used.

The red phosphor may irradiate excitation light to emit light having a peak wavelength ranging from 600 nm to 660 nm.

The red phosphor according to an embodiment of the inventive concept may have excellent characteristics in several aspects thereof. Internal quantum efficiency of the red phosphor may be 80% or above, and specifically, may be 85% or above.

In addition, a half-width of the red phosphor may be 110 nm or less. The red phosphor may have a grain size d50 such that 7 μm≤d50≤25 μm.

In a specific example, the red phosphor may further include an impurity, for example, oxygen of 0.5 wt % or less. The red phosphor may further include at least one selected from Fe, Co and Ni, in an amount of 50 ppm or lower, as an impurity.

Hereinafter, various embodiments of the inventive concept will be described in more detail, but the present inventive concept is not limited thereto.

EXAMPLE 1

As raw materials, strontium nitride, barium nitride, aluminum nitride, silicon nitride and europium nitride were weighed in an environment having relatively low moisture and oxygen components, on the level of, for example, 1% or less, while being filled with inert argon (Ar) gas to thereby prepare the raw materials, and the prepared raw materials were dry-mixed. Here, the weighing of the raw materials was performed to form a composition of $Sr_{0.965}Ba_{0.005}Eu_{0.03}AlSi_4N_7$.

In order to fire the mixed powder, the mixed powder was inserted into a crucible in a space in which moisture and oxygen were limited and the crucible having the mixed powder therein was subjected to a firing process at 1800° C. for 10 hours. At this time, the atmosphere thereof was maintained at the reduction atmosphere of 5% $H_2$ and 95% $N_2$.

The fired phosphor was ground to thereby prepare a nitride phosphor of $Sr_{0.965}Ba_{0.005}Eu_{0.03}AlSi_4N_7$ through a predetermined post heat treatment and a pickling process.

COMPARATIVE EXAMPLE 1

A nitride phosphor was prepared using raw materials and a process similar to those of example 1, but unlike example 1, a raw material containing Ba was not added. That is, strontium nitride, barium nitride, aluminum nitride, silicon nitride and europium nitride were weighed to thereby prepare raw materials and the prepared raw materials were dry mixed. Here, weighing of the raw materials was carried out to form a composition of $Sr_{0.97}Eu_{0.03}AlSi_4N_7$.

In order to fire the mixed powder, the mixed powder was inserted into a crucible in a space in which moisture and oxygen were limited and the crucible having the mixed powder therein was subjected to a firing process at 1800° C. for 10 hours. At this time, the atmosphere thereof was maintained at the reduction atmosphere of 5% $H_2$ and 95% $N_2$.

The fired phosphor was ground to thereby prepare a nitride phosphor of $Sr_{0.97}Eu_{0.03}AlSi_4N_7$ through a predetermined post heat treatment and a pickling process.

With respect to the red phosphors obtained through example 1 and comparative example 1, emission spectra excited by an LED having a peak wavelength of about 450 nm were measured, and the results therefrom, e.g., a relative photoluminescence (PL) intensity, are illustrated in FIG. 1.

As illustrated in FIG. 1, the red phosphor according to comparative example 1 exhibits a peak wavelength of 637 nm and about 100 nm of a half-width, while the red phosphor according to example 1 exhibits a peak wavelength of 638 nm and an increased half-width of about 102 nm.

As illustrated in FIG. 1, it can be confirmed that the red phosphor according to example 1 has a relative intensity increased by 10% or above as compared to the red phosphor according to comparative example 1. As such, it can be appreciated that the red phosphor according to example 1 of the present inventive concept significantly improved conversion efficiency by substituting Sr with a small amount (0.005 mol) of Ba so as to be able to enhance brightness in a final light source employing a red phosphor.

In addition, in order to confirm an appropriate range of a substitution amount of Ba, comparative example 2 was carried out by differentiating the contents of Ba as below, together with examples 2 to 5.

EXAMPLES 2 TO 5

A nitride phosphor was produced using raw materials and a process similar to those of example 1, but unlike example 1, the nitride phosphor was prepared by weighing raw materials of Ba and Sr as illustrated in Table 1. It was confirmed that the nitride phosphors according to the respective examples had the composition of $Sr_{0.96}Ba_{0.01}Eu_{0.03}AlSi_4N_7$ (example 2), $Sr_{0.95}Ba_{0.02}Eu_{0.03}AlSi_4N_7$ (example 3), $Sr_{0.94}Ba_{0.03}Eu_{0.03}AlSi_4N_7$ (example 4), and $Sr_{0.967}Ba_{0.003}Eu_{0.03}AlSi_4N_7$ (example 5), respectively.

COMPARATIVE EXAMPLE 2

A nitride phosphor was prepared using raw materials and a process similar to those of example 1, but unlike example 1, the nitride phosphor was prepared by weighing the raw materials of Ba and Sr as illustrated in Table 1. It was confirmed that the nitride phosphor according to comparative example 2 had the composition of $Sr_{0.93}Ba_{0.04}Eu_{0.03}AlSi_4N_7$.

TABLE 1

| Classification | Example 2 | Example 3 | Example 4 | Example 5 | Comparative Example 2 |
|---|---|---|---|---|---|
| Ba Content (mol) | 0.01 | 0.02 | 0.03 | 0.003 | 0.04 |
| Sr Content (mol) | 0.96 | 0.95 | 0.94 | 0.967 | 0.93 |

Figure 2:
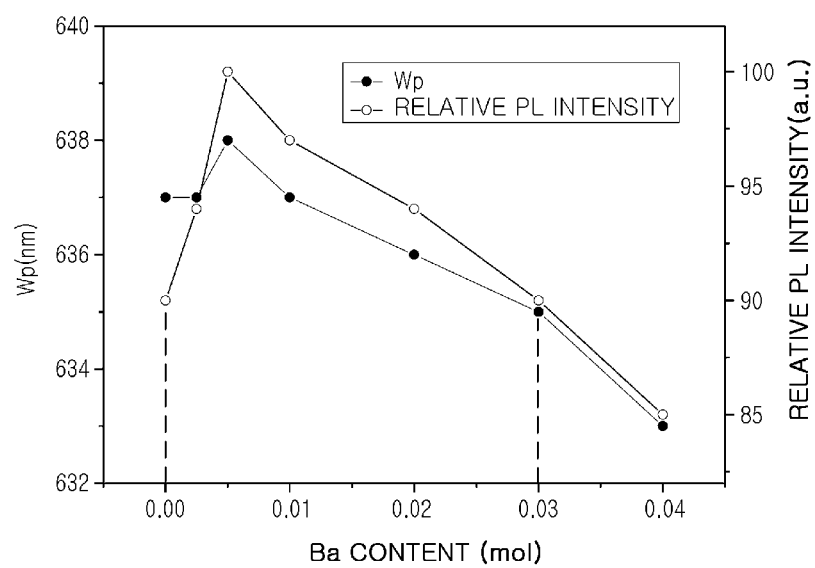
FIG. 2 is a graph illustrating a change in a peak wavelength and brightness according to the content of barium (Ba) according to an inventive example.

With respect to the red phosphors obtained through example 2 to 5 and the red phosphor obtained through comparative example 2, a peak wavelength and a photoluminescence (PL) intensity of emission light were measured using an LED light source having a peak wavelength of 450 nm. The results obtained as above and the results of the foregoing examples 1 to 5 and comparative examples 1 and 2 are illustrated in the graph of FIG. 2. FIG. 2 is a graph illustrating a change in a peak wavelength and brightness depending on the content of barium (Ba) according to the foregoing examples 1 to 5 and comparative examples 1 and 2.

As illustrated in FIG. 2, it can be confirmed that the centroid wavelength and the PL intensity of emission light were changed depending on the substitution amount of Ba for an Sr site. It can be confirmed that even when Ba having the content of a very small amount of 0.003 was substituted like example 5, there was no change in the peak wavelength Wp, but the PL intensity increased by 5% as compared to comparative example 1, in which no Ba was substituted.

Referring to FIG. 2, in the case of example 1, as described above, it can be confirmed that the PL intensity was increased by about 10% as compared to comparative example 1, and as the substitution amount of Ba was increased by up to 0.03 mol, the increase range as compared to comparative example 1 was somewhat reduced, but the PL intensity was somewhat greater than that of comparative example 1. However, when Ba was substituted to have the content of 0.04 exceeding 0.03, it can be confirmed that the PL intensity was reduced by approximately 7 to 8% as compared to comparative example 1.

As such, an appropriate range of the content (x) of Ba may be determined as 0<x<0.3 for improved wavelength conversion efficiency.

Figure 3:
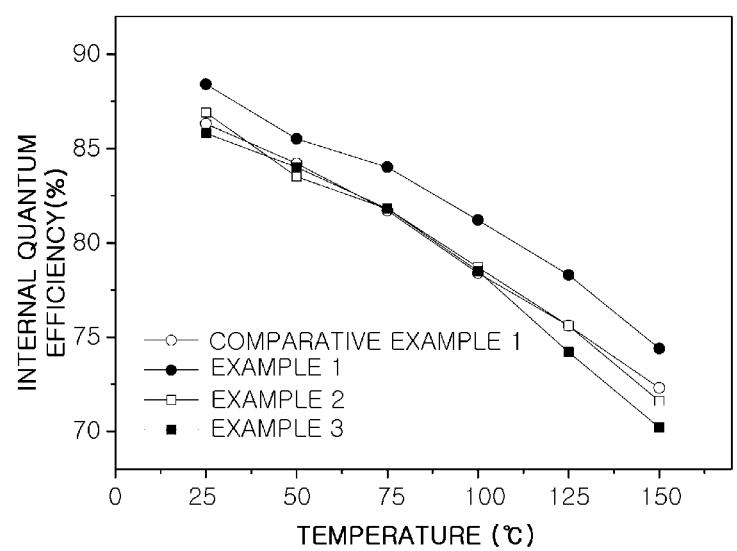
FIG. 3 is a graph illustrating a change in reliability depending on the content of Ba (an environment actually applied to an LED package product) according to an inventive example.

FIG. 3 is a graph illustrating a change in reliability depending on the content of Ba according to the foregoing examples 1 to 3. Respective red phosphors having different contents of Ba were mixed with a silicon resin within an LED package and were cured at about 80° C. to about 200° C., so as to be operated by allowing a current of 150 mA to flow therein. In addition, the operating atmosphere described above was maintained within a chamber having relative humidity of 85% at 85° C. such that stability, that is, reliability was evaluated in the severe atmosphere as compared to an actual operating condition.

As a result, stable characteristics were exhibited according to an increase in the content of Ba. Therefore, it can be confirmed that when Ba was partially substituted, efficiency and stability, that is, reliability, were enhanced.

Observing efficiency and stability, that is, reliability, based on the description as above, an appropriate range of the Ba content may be determined as 0<x<0.3, specifically, 0<x<0.1.

As a factor degrading stability, in general, when as an active ion, $Eu^{2+}$ ions substituted within a phosphor crystal structure are oxidized to $Eu^{3+}$ ions, light emission efficiency may be decreased. The oxidization factor may be a defect in a crystal structure and a reaction due to invasion of oxygen.

$$2Eu^{2+}+\tfrac{1}{2}O_2+V_N \rightarrow 2Eu^{3+}+O^{2-}$$

Here, $V_N$ is a vacancy for nitrogen, generated due to the invasion of oxygen. A reason that stability is increased depending on the content of Ba as illustrated in FIG. 3 may be considered to be a difference in bonding strength between ions. A difference in electronegativity between respective elements is as follows.

Sr—N (2.1), Ba—N (2.2), Eu—N (1.85), Sr—O (2.5), Ba—O (2.6), Eu—O (2.25)

In the case in which Ba is contained, as compared to the case in which Ba is not contained, the possibility that Ba reacts with oxygen may be increased as compared to Sr. That is, Ba—N>Sr—N and Ba—O>Sr—O may be satisfied. Although both barium (Ba) and strontium (Sr) may be oxidized instead of europium (Eu), intensity of Ba for preventing europium from being oxidized is greater than that of Sr.

Therefore, $Ba^{2+}$ reacts with oxygen invading a phosphor crystal structure to thereby be changed to $Ba^{3+}$, such that $Eu^{2+}$ may be maintained as follows.

$$2Ba^{2+}+2Eu^{2+}+(\tfrac{1}{2})O_2+V_N \rightarrow 2Ba^{3+}+2Eu^{2+}+O^{2-}$$

Such improvement in stability or reliability may be obtained in the case of a pure nitride phosphor and further in a case in which an oxygen component is disposed in the vicinity of a nitrogen site within the crystal structure other than the exterior so as to be associated with each other.

The mixing of measured raw materials may be performed by introducing raw materials into a container to homogeneously mix the raw materials using a milling machine without using a solvent. A mixing time may be approximately 1 to 24 hours, and here, a ball may be introduced with the raw materials so as to facilitate the mixing thereof such that a mixing time may be shortened. Such a dry mixing method has an advantage in that the entire process time may be reduced due to absence of an unnecessary dry process of solvent as compared to a wet method. When the mixing of raw materials is completed, powder resulting from the mixing process may be uniformly distributed to have a required micrometer size condition using a sieve formed of a metal or polymer material, like in a wet mixing.

Here, when raw materials are inserted into the container, the process may be performed in an atmosphere of the container in which inert gas is filled and oxygen and moisture are blocked. When a nitride material is used and the process is generally performed in the air atmosphere, the material may react with moisture to oxidize the material, thereby causing characteristic breakdown.

The firing process may be performed by filling a boron nitride (BN) crucible with the distributed mixed powder. In this case, the firing process may be performed at a required firing temperature, for example, 1850 to 2300° C. or 1000 to 1800° C. for about 1 to 24 hours using a heating furnace. The atmosphere in the firing process may be provided using 100% nitrogen ($N_2$) gas or mixed nitrogen gas containing 1 to 10% of hydrogen.

Brightness of phosphor may be improved by allowing a synthesized phosphor powder to be induced or by uniformly pulverizing the synthesized phosphor powder and then repetitively performing a post heat treatment once to three times.

The finally fired phosphor powder may be induced or pulverized using a pulverizer and a grain size thereof may be controlled in the distribution process to implement an appropriate grain size. In this case, a composite crystal phosphor having a uniform size of 16 micrometers or below may be obtained using, specifically, a 16 micrometer sized sieve.

Here, the phosphor powder obtained as above may be subjected to a post treatment using distilled water (e.g., D.I.Water), an inorganic acid, an organic acid and/or a base such that impurities such as residual glass phases, unreacted metals, or the like, included in the phosphors, may be removed. For example, nitric acid having a concentration of 0.1 to 60% may be applied thereto and stirred for 1 to 10 hours to thereby elute and remove residual impurities.

As an inorganic acid, in addition to a nitric acid, a sulfuric acid, a hydrochloric acid, a fluoric acid, or a mixed solution of these inorganic acids may be used. On the other hand, impurities not removed through an acid treatment may be eliminated using a base. As the base, an inorganic base such as sodium hydroxide, potassium hydroxide, or the like, or a mixed solution of these inorganic bases may be used.

A phosphor slurry provided after the acid treatment and the base treatment as described above may be cleaned with D.I. water so as to remove a residual acid or base and a phosphor powder required therefor may be finally obtained through a wet distribution, filtering and drying. In this case, the dry process may be carried out at 50 to 150° C. for an appropriate period of time.

Hereinafter, various application forms including a phosphor according to the present inventive concept may be described.

Figure 4:
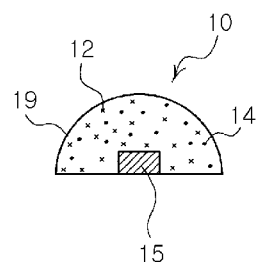
FIGS. 4 to 6 are schematic diagrams of white light emitting devices according to various embodiments of the inventive concept.

FIG. 4 is a schematic view of a white light emitting device according to an embodiment of the present inventive concept.

As illustrated in FIG. 4, a white light emitting device 10 according to an embodiment of the present inventive concept may include a blue semiconductor light emitting device 15 and a resin capsulation unit 19 encapsulating the blue semiconductor light emitting device 15 and having an upwardly convex lens shape.

The resin encapsulation unit 19 according to an embodiment of the present inventive concept is illustrated as having a hemispherical lens shape so as to secure relatively wide directivity. The blue semiconductor light emitting device 15 may be directly mounted on a separate circuit board. The resin encapsulation unit 19 may be formed of the silicon resin, an epoxy resin or a combination thereof. The resin encapsulation unit 19 may include a green phosphor 12 with the foregoing described nitride-based red phosphor 14 distributed therein.

The green phosphor 12 employed in an embodiment of the present inventive concept may include at least one of an oxide phosphor represented by an empirical formula of $M_3Al_5O_{12}$, an oxynitride phosphor, a β-sialon phosphor and a phosphor of $La_3Si_6N_{11}$:Ce. Here, M is at least one group II or III element selected from Y, Lu, Gd, Ga, Be, Mg, Ca, Sr, Ba, Zn, Eu and Ce, and A is at least one group IV element selected from C, Si, Ge, Sn, Ti, Zr and Hf.

In addition, the green phosphor 12 may have a β-type $Si_3N_4$ crystal structure to be used alone or together with other green phosphors, and further, as the green phosphor 12, an oxynitride phosphor represented by an empirical formula of $Si_{6-z}Al_zO_zN_{8-z}:Eu_a,M_b$ may be used. Here, M is at least one selected from Sr and Ba, and an addition amount a of Eu may range from 0.1 to 5 mol %, and an addition amount b of M may range from 0.1 to 10 mol %, and an Al composition ratio z may satisfy $0.1<z<1$.

The above-mentioned β-SiAlON phosphor represented by the empirical formula of $Si_{6-z}Al_zO_zN_{8-z}:Eu_a,M_b$ may also be a green phosphor and may provide a phosphor emitting light having a peak wavelength ranging from 500 to 550 nm by irradiating excitation light. The green phosphor according to an embodiment of the present inventive concept may have significantly improved brightness, for example, about 20%, as compared to a β-SiAlON phosphor according to the related art, by adding a small predetermined amount of Sr to an empty sphere of host matrix, i.e., a β-SiAlON crystal represented by the empirical formula of $Si_{6-z}Al_zO_zN_{8-z}:Eu_a$, $M_b$, and may also be provided as a green phosphor having a wavelength becoming shorter to 540 nm or below.

The β-SiAlON green phosphor represented by the empirical formula of $Si_{6-z}Al_zO_zN_{8-z}:Eu_a,M_b$ may provide color characteristics able to satisfy a green region in the standard RGB (Srgb) of CIE 1931 color chromaticity coordinates so as to contribute to exhibiting a vivid white. In addition, the doping of Sr may contribute to phase stability of β-SiAlON to thereby improve reliability characteristics and significantly reduce a change in y color coordinates affecting an efficiency change depending on elapsed time, and may increase improvement effects in terms of productivity and yield.

Meanwhile, the red phosphor 14 employed in an embodiment of the present inventive concept may be mixed with other red phosphors in addition to the above-mentioned red phosphor. For example, the additionally used red phosphor as above may be at least one selected from a nitride-based phosphor of $M1AlSiN_x:Re$ (1≤x≤5), a sulfide-based phosphor of M1D:Re and a silicate-based phosphor of $(Sr,L)_2SiO_{4-x}N_y:Eu$ (0<x<4, y=2x/3).

Here, M1 may be at least one element selected from Ba, Sr, Ca and Mg, D may be at least one element selected from S, Se and Te, L may be at least one group II element selected from Ba, Ca and Mg or may be at least one group I element selected from Li, Na, K, Rb and Cs, D may be at least one selected from S, Se and Te, and Re may be at least one selected from Y, La, Ce, Nd, Pm, Sm, Gd, Tb, Dy, Ho, Er, Tm, Yb, Lu, F, Cl, Br and I.

As such, white light having a relatively high color rendering index of 70 or higher may be provided in a form in which a specific green phosphor and a specific red phosphor are combined in consideration of at least one of a half-width, a peak wavelength, conversion efficiency and the like. In addition, since light of several wavelength bands may be obtained through the plurality of phosphors, color reproduction characteristics may be enhanced.

In the red phosphor described above, in the case of the silicate-based phosphor of $(Sr,L)_2SiO_{4-x}N_y:Eu$, the range of x may satisfy 0.15≤x≤3. A portion of Si in the empirical formula described above may be substituted with a different element, for example, at least one element selected from B, Al, Ga and In, or, may be substituted with at least one element selected from Ti, Zr, Gf, Sn and Pb.

A dominant wavelength of the blue semiconductor light emitting device may range from 430 to 470 nm. In this case, in order to increase the improvement of color rendering index by securing a relatively wide spectrum in a visible light band, a light emission wavelength peak of the green phosphor 12 may range from 500 to 550 nm, and a light emission wavelength peak of the red phosphor 14 may range from 600 to 650 nm.

Specifically, the blue semiconductor light emitting device may have a half-width of 10 to 50 nm, the green phosphor may have a half-width of 30 to 200 nm, and the red phosphor may have a half-width of 50 to 250 nm.

According to another embodiment of the present inventive concept, in addition to the red phosphor 14 and the green phosphor 12 described above, a yellow or yellowish-orange phosphor may be further included in the white light emitting device. The green phosphor 12 may be substituted with a yellow phosphor as necessary, and in this case, a light emission peak wavelength of the yellow phosphor may range from 550 to 580 nm.

Figure 6:
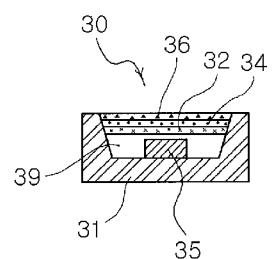

In this case, a further improved color rendering index may be secured. Such an embodiment is illustrated in FIG. 6.

Figure 5:
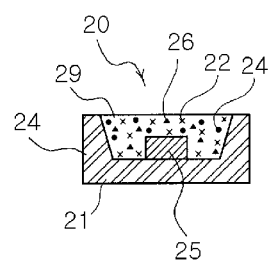

With reference to FIG. 5, a white light emitting device 20 according to an embodiment of the present inventive concept may include a package body 21 having a reflective cup formed in a central portion thereof, a blue LED chip 25 mounted on the bottom of the reflective cup, and a transparent resin encapsulation unit 29 disposed within the reflective cup and encapsulating the blue LED chip 25.

The resin encapsulation unit 29 may be formed of, for example, a silicon resin, an epoxy resin or a combination thereof. In an embodiment of the present inventive concept, the resin encapsulation unit 29 may further include a yellow or yellowish-orange phosphor 26 with a green phosphor 22 and a red phosphor 24 provided as the above-described nitride-based phosphor.

That is, the green phosphor 22 may include at least one of an oxide phosphor represented by an empirical formula of $M_3Al_5O_{12}$, an oxynitride phosphor, a β-sialon phosphor, and a phosphor of $La_3Si_6N_{11}:Ce$. The red phosphor 24 may further include at least one of a nitride-based phosphor of $M1AlSiN_x:Re$ (1≤x≤5) and a sulfide-based phosphor of M1D:Re, in addition to the composite crystal phosphor described above. Here M1 may be at least one element selected from the group consisting of Ba, Sr, Ca, and Mg, and Re may be at least one selected from the group consisting of Y, La, Ce, Nd, Pm, Sm, Gd, Tb, Dy, Ho, Er, Tm, Yb, Lu, F, Cl, Br and I.

In addition, the white light emitting device 20 according to an embodiment of the present inventive concept may further include a yellow or yellowish-orange phosphor 26. The yellow or yellowish-orange phosphor may emit light within a wavelength band disposed between green and red wavelength bands. The yellow or yellowish-orange phosphor may be at least one of a silicate-based phosphor, a garnet-based phosphor, and a nitride-based phosphor, and the yellowish-orange phosphor may be a garnet-based phosphor of a α-SiAlON:Re-based phosphor or a garnet-based phosphor of YAG and TAG.

Although the above-described embodiment illustrates the example in which two or more types of phosphor powder are mixed and distributed in a single resin encapsulation unit region, various different structures may be applied thereto. In more detail, the above-mentioned two or three types of phosphor may have different layer structures. For example, the green phosphor, the red phosphor and the yellow or yellowish-orange phosphor may be provided as a phosphor film having a dual-layer structure by distributing phosphor powder at a relatively high pressure.

As shown in FIG. 6, a white light emitting device may be implemented to have a structure including a plurality of phosphor-contained resin layers.

With reference to FIG. 6, a white light emitting device 30 according to an embodiment of the present inventive concept may include a package body 31 having a reflective cup formed in a central portion thereof, a blue LED 35 mounted on the bottom of the reflective cup, and a transparent resin encapsulation unit 39 disposed within the reflective cup and encapsulating the blue LED 35.

Resin layers containing different phosphors may be provided on the resin encapsulation unit 39. That is, a wavelength conversion unit may be configured to include a first resin layer 32 containing a green phosphor, a second resin layer containing a red phosphor, that is, the above-mentioned nitride-based phosphor, and a third resin layer 36 containing the yellow or yellowish-orange phosphor.

The phosphor used in an embodiment of the present inventive concept may be similar to the phosphor illustrated and described with reference to FIG. 6, or a phosphor similar thereto may be used as the phosphor used in an embodiment of the present inventive concept.

The white light obtained through the combination of the phosphors proposed according to an embodiment of the inventive concept may exhibit a relatively high color rendering index. That is, when a yellow phosphor is combined with the blue semiconductor light emitting device, blue wavelength light and converted yellow light may be obtained. Since there is little wavelength light within the green and red bands in terms of the entire visible ray spectrum, it may be difficult to secure a color rendering index approximate to natural light. Specifically, the converted yellow light has a relatively narrow half-width in order to obtain relatively high conversion efficiency, and thus, in this case, the color rendering index may be further lowered. In addition, since white light characteristics represented according to a single yellow conversion extent may be easily varied, it may be difficult to guarantee excellent color reproduction characteristics.

Meanwhile, in an inventive example of the present inventive concept, in which a blue LED chip, a green phosphor G and a red phosphor R are combined, since light is emitted in the green and red bands as compared to the existing example, e.g., a conventional example, a relatively wider spectrum may be obtained within a visible light band and as a result, a color rendering index may be significantly improved. In addition, a yellow or yellowish-orange phosphor capable of providing an intermediate wavelength band between the green and red bands may be further included such that the color rendering index may be significantly improved.

Similar to the description above, a green phosphor may be substituted with a yellow phosphor instead of adding the yellow phosphor, and in this case, the light emission peak wavelength of the yellow phosphor may range from 550 to 580 nm.

Figure 7:
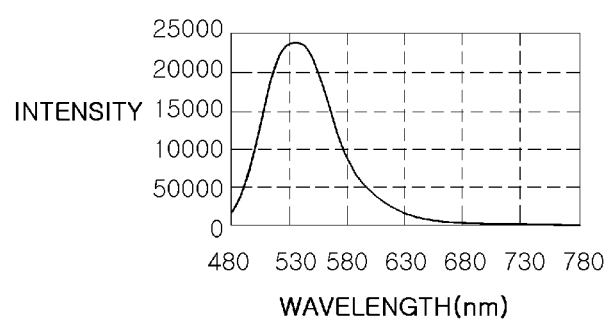
FIG. 7 illustrates a light emission spectrum of a green phosphor employed in a white light emitting device according to an embodiment of the inventive concept.

FIG. 7 illustrates an example of a light emission spectrum for a green phosphor employed in an embodiment of the inventive concept. As illustrated in FIG. 7, it can be appreciated that an emission spectrum having a peak wavelength of about 540 nm and a half-width of 76.7 nm is provided in a green phosphor obtained from the oxynitride phosphor according to an embodiment of the present inventive concept.

Figure 8:
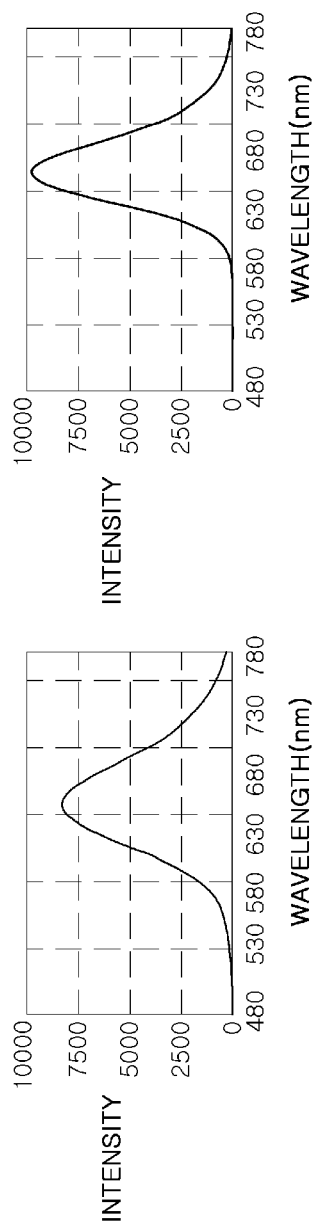
FIGS. 8A and 8B illustrate light emission spectra of different red phosphors employed in a white light emitting device according to an embodiment of the inventive concept.

FIGS. 8A and 8B illustrate light emission spectra for a red phosphor additionally adoptable in an embodiment of the inventive concept.

FIG. 8A illustrates a spectrum of a nitride-based phosphor represented by the empirical formula of $MAlSiN_x$:Re ($1 \leq x \leq 5$), wherein M is at least one element selected from Be, Ba, Sr, Ca and Mg, and Re is at least one element selected from Y, La, Ce, Nd, Pm, Sm, Gd, Tb, Dy, Ho, Er, Tm, Yb, Lu, F, Cl, Br and I. The converted red light may exhibit a peak wavelength of about 640 nm and a half-width of 85 nm.

FIG. 8B illustrates a spectrum of the sulfide-based phosphor of M1D:Re, wherein M1 is at least one element selected from the group consisting of Ba, Sr, Ca and Mg, and Re is at least one element selected from the group consisting of Y, La, Ce, Nd, Pm, Sm, Gd, Tb, Dy, Ho, Er, Tm, Yb, Lu, F, Cl, Br and I. The converted red light may exhibit a peak wavelength of about 655 nm and a half-width of about 55 nm.

Figure 9:
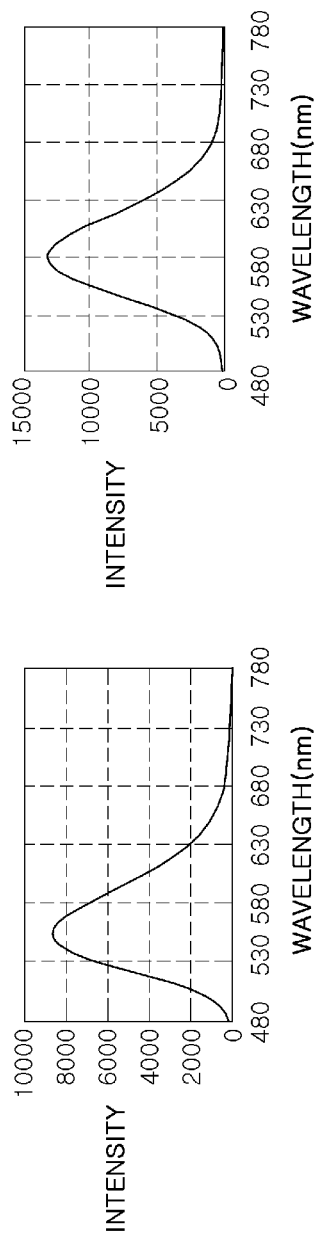
FIGS. 9A and 9B illustrate light emission spectra of yellow or yellowish-orange phosphors employed in a white light emitting device according to an embodiment of the inventive concept.

FIGS. 9A and 9B illustrate a spectrum of a yellow or yellowish-orange phosphor selectively adopted in an embodiment of the inventive concept.

FIG. 9A illustrates a spectrum of a silicate-based phosphor. Converted yellow light may exhibit a peak wavelength of about 555 nm and a half-width of 90 nm.

FIG. 9B illustrates a spectrum of a phosphor of $\alpha$-SiAlON:Re, wherein Re is at least one selected from Y, La, Ce, Nd, Pm, Sm, Gd, Tb, Dy, Ho, Er, Tm, Yb, Lu, F, Cl, Br and I, and ranges from 1 ppm to 50000 ppm. Converted yellow light has a peak wavelength of about 580 nm and a half-width of about 88 nm.

As such, white light having a relatively high color rendering index of 70 or higher may be provided in a form in which a specific green phosphor and a specific red phosphor are combined in consideration of at least one of a half-width, a peak wavelength, conversion efficiency and the like, or by adding a yellow or yellowish-orange phosphor in such a combination form.

In color coordinates of red light in the light as described above, x and y coordinates are within a regional range of $0.55 \leq x \leq 0.65$ and $0.25 \leq y \leq 0.35$, in color coordinates of green light, x and y coordinates are within a regional range of $0.2 \leq x \leq 0.4$ and $0.5 \leq y \leq 0.7$, and in color coordinates of blue light, x and y coordinates are within a regional range of $0.1 \leq x \leq 0.2$ and $0.02 \leq y \leq 0.15$, based on CIE 1931 chromaticity coordinates.

When a dominant wavelength of the blue semiconductor light emitting device is within the range of 430 to 470 nm, a light emission wavelength peak of the green phosphor may range from 500 to 550 nm, and a light emission wavelength peak of the red phosphor may range from 550 to 600 nm (Yellow phosphor: 550-580 nm, Yellowish-orange phosphor: 580-600 nm).

In addition, when the blue semiconductor light emitting device has a half-width of 10 to 50 nm, the green phosphor may have a half-width of 30 to 200 nm, specifically, 60 to 80 nm, and the red phosphor may have a half-width of 50 to 250 nm. The yellow or yellowish-orange phosphor may have a half-width of 20 to 100 nm.

According to an embodiment of the inventive concept through the selection and combination of respective phosphors having the conditions as described above, a relatively wide spectrum may be secured within a visible light band and excellent white light having a relatively high color rendering index may be provided.

Figure 11:
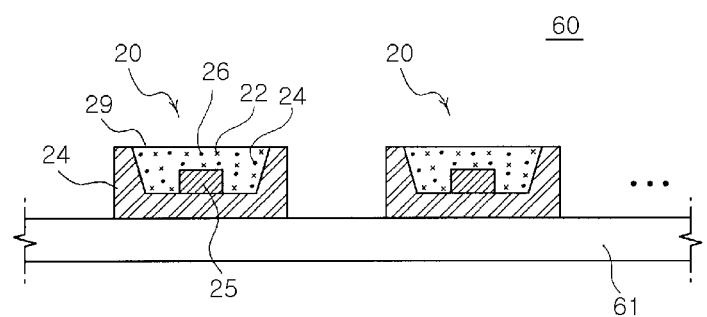
Figure 12:
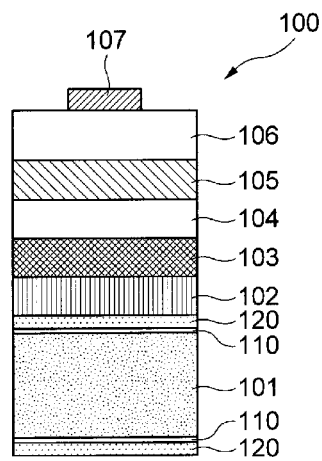
FIGS. 12 and 13 are side cross-sectional views illustrating examples of a semiconductor light emitting device employed in a white light emitting device according to various embodiments of the inventive concept.

A white light source module according to an embodiment of the inventive concept may be usefully employed as a light source for an LCD backlight unit. That is, the white light source module according to the embodiment may be provided as a light source for an LCD backlight unit and may be combined with several optical members, for example, a diffusion plate, a light guard plate, a reflective plate, a prism sheet, or the like, to thereby configure a backlight assembly. FIGS. 11 and 12 illustrate white light source modules as above.

Figure 10:
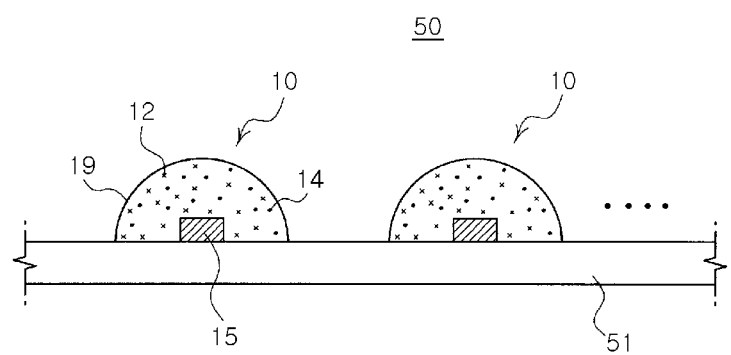
FIGS. 10 and 11 are side cross-sectional views schematically illustrating LED light source modules according to various embodiments of the inventive concept.

First, with reference to FIG. 10, a light source module 50 for an LCD backlight may include a circuit board 51 and a plurality of white LED devices 10 mounted thereon to be arrayed. A conductive pattern may be formed on an upper surface of the circuit board 51 to be connected to the LED devices 10.

The respective white LED device 10 illustrated in FIG. 10 may be considered to be the white LED device 10 described with reference to FIG. 4. That is, a blue LED 15 may be directly mounted on the circuit board 51 in a chip on board (COB) scheme. The configuration of respective white LED devices 10 may include a hemispheric resin encapsulation unit 19 having a lens function without a separate reflective wall, such that respective white LED devices 10 may have a relatively wide beam angle. A wide angle of the spread beam of the respective white light source may contribute to a reduction in the size, for example, a thickness or a width, of an LCD display.

With reference to FIG. 11, a light source module 60 for an LCD backlight may include a circuit board 61 and a plurality of white LED devices 20 mounted thereon to be arrayed. The white LED device 20 may include a blue semiconductor light emitting device 25 mounted within a reflective cup in a package body 21 and a resin encapsulation unit 29 encapsulating the blue semiconductor light emitting device 25. The resin encapsulation unit 29 may include a red phosphor 24 containing the composite crystal phosphor as described above, a green phosphor 22 and a yellow or yellowish-orange phosphor 26 distributed therein.

Various types of white light emitting devices using the above-described phosphors as wavelength conversion materials may be implemented according to an embodiment of the present inventive concept. Hereinafter, a light emitting device employed in a white light emitting device according to an embodiment of the present inventive concept will be described with reference to the accompanying drawings.

First, a semiconductor stacking structure of a light emitting device 100 shown in FIG. 12 may have a structure as below. A substrate 101 formed of a silicon-aluminum alloy (hereinafter, referred to as 'Si—Al alloy substrate') may be provided, and on upper and lower surfaces of the Si—Al alloy substrate 101, a protective layer 120 may be formed. A bonding metal layer 102, a reflective metal layer 103, a p-type semiconductor layer 104, an active layer 105 and an n-type semiconductor layer 106 may be sequentially stacked on the protective layer 120. The p-type and n-type semiconductor layers 104 and 106 and the active layer 106 may be formed of a GaN-based semiconductor, that is, a semiconductor material of $Al_xGa_yIn_{(1-x-y)}N$ ($0 \le x \le 1$, $0 \le y \le 1$, $0 \le x+y \le 1$) or the like, and may form a light emitting structure.

An n-side electrode 107 may be formed on the n-type semiconductor layer 106. The reflective metal layer 103 interposed between the bonding metal layer 102 and the p-type semiconductor layer 104 may increase brightness of the light emitting device by allowing light incident from the semiconductor layer to be reflected upwardly. The reflective metal layer 103 may be formed of a metal, for example, a metal selected from Au, Ag, Al, Rh and alloys of two or more, or the like. However, the reflective metal layer 103 may not be formed as necessary.

The bonding metal layer 102 may serve to bond the Si—Al alloy substrate 101 to the light emitting structure, and Au or the like may be used. Here, although the light emitting device 100 according to an embodiment of the present inventive concept includes the bonding metal layer 102, the Si—Al alloy substrate 101 may be directly bonded to an upper surface of the p-type semiconductor layer 104 without using the bonding metal layer 102. Therefore, in the light emitting device 100 according to an embodiment of the present inventive concept, the Si—Al alloy substrate 101 may be used as a conductive substrate.

Such a Si—Al alloy may be useful in terms of a thermal expansion coefficient thereof, heat conductivity, mechanical process characteristics and cost. That is, the thermal expansion coefficient of the Si—Al alloy substrate 101 may be similar to a thermal expansion coefficient of a sapphire substrate. Therefore, when the light emitting device 100 is manufactured using the Si—Al alloy substrate 101, a phenomena in which a substrate is warped and cracks occur in a light emitting structure, generated in a bonding process of an existing conductive substrate formed of Si and a separation process of a sapphire substrate using irradiation of laser beam, may be significantly reduced, such that high quality light emitting devices 100 in which the occurrence of defects is reduced may be obtained.

In addition, the thermal conductivity of the Si—Al alloy substrate 101 may be about 120 to 180 W/m·K and may have excellent heat emission characteristics. In addition, since the Si—Al alloy substrate 101 may be easily manufactured by melting Si and Al at a relatively high pressure, the Si—Al alloy substrate may be easily obtained at low costs.

Specifically, the light emitting device 100 according to an embodiment of the present inventive concept may further include the protective layers 120 formed on upper and lower surfaces of the Si—Al alloy substrate 101 and preventing a chemical from invading into the Si—Al alloy substrate 101 at the time of a cleaning process. Here, the protective layer 120 may be formed of a metal, a dielectric having electrical conductivity, or the like. Here, when the protective layer 120 is formed of a metal, the protective layer 120 may be formed of any one of a metal group of Ni, Au, Cu, W, Cr, Mo, Pt, Ru, Rh, Ti and Ta, or may be formed of an alloy of at least two selected from the metal group.

In this case, the protective layer 120 may be formed using an electroless plating scheme, metal deposition, sputtering, CVD, or the like. Here, additionally, a seed metal layer 110 serving as a seed in a plating process of the protective layer 120 may be formed between the Si—Al alloy substrate 101 and the protective layer 120 formed of a metal. The seed metal layer 110 may be formed of Ti/Au or the like. In addition, when the protective layer 120 is formed of a dielectric material having electrical conductivity, the dielectric having electrical conductivity may be formed of indium tin oxide (ITO), indium zinc oxide (IZO), copper indium oxide (CIO), or the like. In this case, the protective layer 120 may be formed through a deposition scheme, a sputtering scheme or the like. The protective layer 120 may have a thickness of 0.01 μm or higher and 20 μm or below, specifically, 1 μm or higher and 10 μm or below.

As described above, the light emitting device employed in the white light emitting device according to an embodiment of the present inventive concept may further include the protective layer 120 formed of, for example, Ni, on a surface of the Si—Al alloy substrate 101, such that an Al metal of the Si—Al alloy substrate 101 may be prevented from being etched by a chemical such as HCl, HF, KOH, or the like, used in a cleaning process performed after the separation of the sapphire substrate or KOH or the like used in a surface texturing process of an n-type semiconductor layer 106.

Therefore, the light emitting device according to an embodiment of the present inventive concept has an effect of preventing an occurrence of a defect in which the light emitting structure bonded to the upper part of the Si—Al alloy substrate 101 is delaminated therefrom by blocking concave and convex portions from being formed on the surface of the Si—Al alloy substrate 101.

In addition, when the protective layer 120 is formed of a metal such as Ni or the like, surface roughness of the Si—Al alloy substrate 101 may be improved to thereby provide firm bonding between the Si—Al alloy substrate 101 and the light emitting structure. That is, in the case of the related art, the Si—Al alloy substrate 101 may be subjected to a cleaning process using a chemical material such as acid or the like for removing a natural oxide film before forming the bonding metal layer 102, thereby forming surface irregularity having an average of 200 to 500 nm while the Al metal in the surface of the Si—Al alloy substrate is etched. However, as in an embodiment of the inventive concept, a metal such as Ni or the like may be formed as the protective layer 120 on the surface of the Si—Al alloy substrate 101 and a nickel (Ni) chemical mechanical polishing treatment may then be performed to thereby reduce the surface irregularity to 5 nm or below and thus improve surface roughness like a mirror surface.

As such, the firm bonding between the Si—Al alloy substrate and the light emitting structure may be obtained by improving the surface roughness of the Si—Al alloy substrate 101 and bonding yield may be enhanced.

Figure 13:
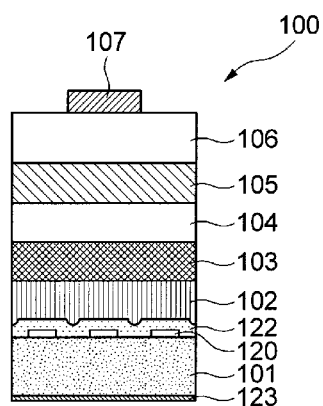

FIG. 13 illustrates another example of a light emitting device employed in a white light emitting device according to an embodiment of the present inventive concept.

Although the light emitting device shown in FIG. 13 is similar to the light emitting device shown in FIG. 12, the device shown in FIG. 13 is different from the device shown in FIG. 12 in that the protective layer 120 is formed on an upper surface of the Si—Al alloy substrate 101 to expose a portion of the Si—Al alloy substrate 101, rather than being formed on the entire upper and lower surfaces of the Si—Al alloy substrate 101, a conductive layer 122 is further formed on the protective layer 120 and the upper surface of the Si—Al alloy substrate 101 through the protective layer 120, and a contact metal layer 123 is formed on the lower surface of the Si—Al alloy substrate 101.

Specifically, the protective layer 120 may be formed of an insulating material other than a metal or a dielectric having electrical conductivity. That is, in the light emitting device according to an embodiment of the present inventive concept, as the protective layer 120 is formed of an insulating material instead of a metal or a dielectric having electrical conductivity, the protective layer 120 may be formed to expose a portion of an upper surface of the Si—Al alloy substrate 101 and the conductive layer 122 may be further formed on the Si—Al alloy substrate 101 and the protective layer 120 in order to conduct between the Si—Al alloy substrate 101 having the protective layer 120 formed thereon and the light emitting structure formed above the protective layer 120. Here, the conductive layer 122 may be formed of a metal or the like.

Meanwhile, a white light emitting device according to an embodiment of the present inventive concept may adopt a light emitting device having a variation in a structure in which an electrode is disposed so as to be able to operate at a relatively high current level, unlike the foregoing light emitting device.

Figure 14:
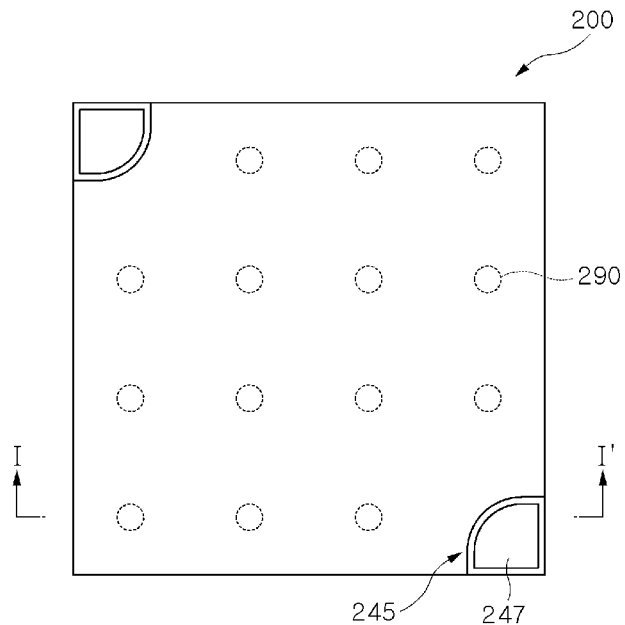
FIGS. 14 and 15 are a plan view and aside cross-sectional view illustrating an example of a semiconductor light emitting device employed in a white light emitting device according to an embodiment of the inventive concept.
Figure 15:
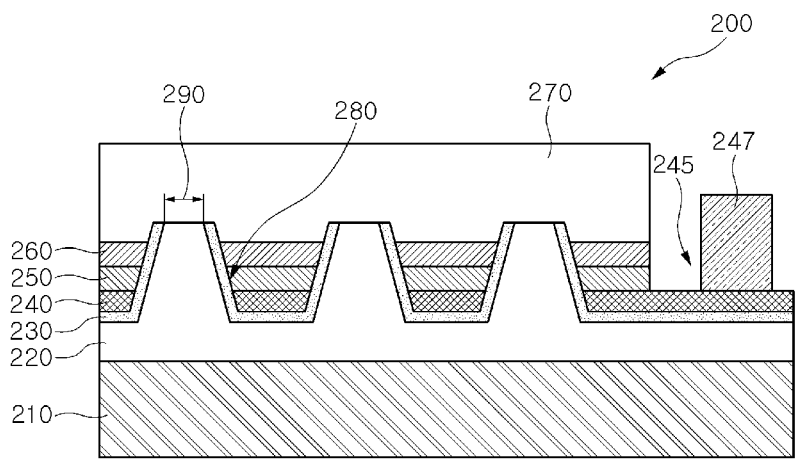

FIGS. 14 and 15 are a plan view and a cross-sectional view illustrating a light emitting device in another example of light emitting devices according to embodiments of the present inventive concept. Here, FIG. 15 is a cross-sectional view taken along line I-I' of FIG. 14.

With reference to FIGS. 14 and 15, a semiconductor light emitting device 200 according to an embodiment of the present inventive concept may include a conductive substrate 210 and a first electrode layer 220, an insulating layer 230, a second electrode layer 240, a second conductive semiconductor layer 250, an active layer 260, and a first conductive semiconductor layer 270, to be sequentially stacked on the conductive substrate 210.

The conductive substrate 210 may be formed of a electrically conductive material. For example, the conductive substrate 210 may be a metal substrate including any one of Au, Ni, Cu and W or may be a semiconductor substrate including one of Si, Ge and GaAs. The first electrode layer 220 may be disposed on the conductive substrate 210. The first electrode layer 220 may be formed of a material capable of significantly reducing contact resistance between the conductive substrate 210 and the first conductive semiconductor layer 270 such that the conductive substrate 210 and the first conductive semiconductor layer 270 are electrically connected to each other.

The first electrode layer 220 may be disposed on the conductive substrate 210. In addition, a partial region of the first electrode layer 220 may penetrate the insulating layer 230, the second electrode layer 240, the second conductive semiconductor layer 250, and the active layer 260 and may be extended to a predetermined region of the first conductive semiconductor layer 270 through a contact hole 280 to contact the first conductive semiconductor layer 270 such that the conductive substrate 210 may be electrically connected to the first conductive semiconductor layer 270, as shown in FIG. 15. That is, the first electrode layer 220 may electrically connect the conductive substrate 210 to the first conductive semiconductor layer 270 through the contact hole 280. In other words, the conductive substrate 210 may be electrically connected to the first conductive semiconductor layer 270 through a contact area 290 of the contact hole 280, that is, an area through which the first electrode layer 220 and the first conductive semiconductor layer 270 contact each other through the contact hole 280.

On the other hand, the insulating layer 230 electrically insulating the first electrode layer 220 from the layers other than the conductive substrate 210 and the first conductive semiconductor layer 270 may be formed on the first electrode layer 220. That is, the insulating layer 220 may be interposed between the first electrode layer 220 and sides of the second electrode layer 240, the second conductive semiconductor layer 250 and the active layer 260 exposed through the contact hole 280, as well as between the first electrode layer 220 and the second electrode layer 240. In addition, a predetermined region of the first conductive semiconductor layer 270 through which the contact hole 280 penetrates may also be provided with the insulating layer 230 formed on a side thereof to be insulated.

The second electrode layer 240 may be formed on the insulating layer 230. In addition, the second electrode layer 240 may not be formed on predetermined regions of the insulating layer 230 through which the contact hole 280 penetrates, as described above. Here, the second electrode layer 240 may include at least one exposed region 245, that is, an exposed portion in an interface through which the second electrode layer 240 and the second conductive semiconductor layer 250 contact each other as shown in FIG. 15. An electrode pad unit 247 may be provided on the exposed region 245 to connect the second electrode layer 240 to an external power source.

Meanwhile, the second conductive semiconductor layer 250, the active layer 260 and the first conductive semiconductor layer 270 to be described below may not be provided on the exposed region 245. In addition, the exposed region 245 may be formed on an edge of the semiconductor light emitting device 200 as shown in FIG. 15 so as to significantly increase a light emission area of the semiconductor light emitting device 200. On the other hand, the second electrode layer 240 may include at least one of Ag, Al and Pt, such that since the second electrode layer 240 electrically contacts the second conductive semiconductor layer 250, contact resistance of the second conductive semiconductor layer 250 may be significantly reduced and light emission efficiency may also be increased by allowing light generated in the active layer 260 to be reflected and directed externally.

The second conductive semiconductor layer 250 may be provided on the second electrode layer 240, the active layer 260 may be provided on the second conductive semiconductor layer 250, and the first conductive semiconductor layer 270 may be provided on the active layer 260. Here, the first conductive semiconductor layer 270 may be an n-type nitride semiconductor, and the second conductive semiconductor layer 250 may be a p-type nitride semiconductor. On the other hand, the active layer 260 may be formed of a different material selected depending on a material forming the first conductive semiconductor layer 270 and the second conductive semiconductor layer 250. That is, since the active layer 260 is a layer emitting light by converting energy through the recombination of electrons and holes into light, the active layer 260 may be formed of a material having an energy band gap smaller than energy band gaps of the first conductive semiconductor layer 270 and the second conductive semiconductor layer 250.

Figure 16:
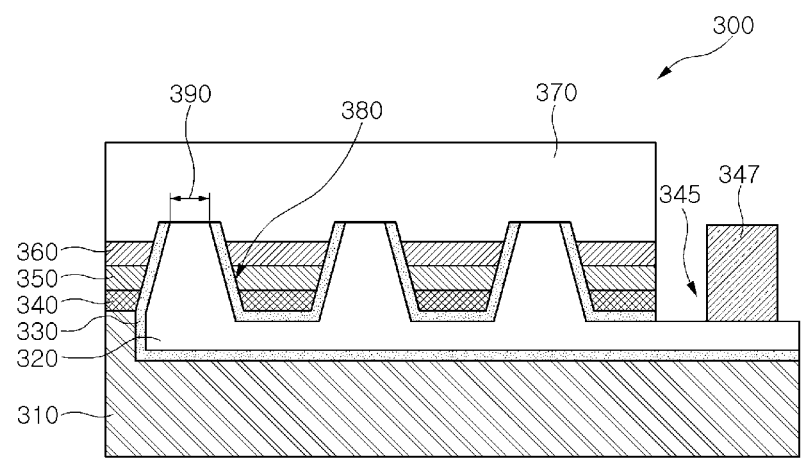
FIG. 16 is a side cross-sectional view illustrating another example of a semiconductor light emitting device employed in a white light emitting device according to an embodiment of the inventive concept.

Meanwhile, a light emitting device 300 shown in FIG. 16 may be configured of a second conductive semiconductor layer 350, an active layer 360 and a first conductive semiconductor layer 360 formed on a conductive substrate 310. In this case, a second electrode layer 340 may be interposed between the second conductive semiconductor layer 350 and the conductive substrate 310, and the second electrode layer 340 may not necessarily be formed.

In an embodiment of the present inventive concept, a contact hole 380 having a contact region 390 contacting a first conductive semiconductor layer 370 may be connected to a first electrode layer 320, and the first electrode layer 320 may have an electric connection unit 345 exposed externally. The electric connection unit 345 may be provided with an electrode pad unit 347 formed thereon. The first electrode layer 320 may be electrically isolated from the active layer 360, the second conductive semiconductor layer 350, the second electrode layer 340 and the conductive substrate 310 by using an insulating layer 330.

Unlike the foregoing embodiment in which the contact hole is connected to the conductive substrate, in an embodiment of the present inventive concept, the contact hole 380 may be electrically isolated from the conductive substrate 310 and the first electrode layer 320 connected to the contact hole 380 may be externally exposed. The conductive substrate 310 may be electrically connected to the second conductive semiconductor layer 350. Thus, the conductive substrate 310 has a polarity different from that in the foregoing embodiment.

Thus, the light emitting device as described above may secure a significantly increased light emission area by forming a portion of a first electrode on a light emission surface and disposing a remaining portion thereof on a lower part of the active layer. In addition, a uniform current distribution may be obtained at a relatively high operating current level applied thereto by disposing the electrode on the light emission surface to be uniform, thereby alleviating a current concentration phenomenon at a high operating current.

As such, the light emitting device shown in FIGS. 15 and 16 may be considered to include a semiconductor laminate having first and second principal surfaces opposing each other and including first and second conductive semiconductor layers respectively providing the first and second principal surfaces and an active layer formed therebetween, a contact hole formed from the second principal surface to pass through the active layer and connected to a partial region of the first conductive semiconductor layer, a first electrode formed on the second principal surface of the semiconductor laminate and connected to the partial region of the first conductive semiconductor layer through the contact hole, and a second electrode formed on the second principal surface of the semiconductor layer and connected to the second conductive semiconductor layer. Here, one of the first and second electrodes may have a structure protruded in a lateral direction of the semiconductor laminate.

Figure 17:
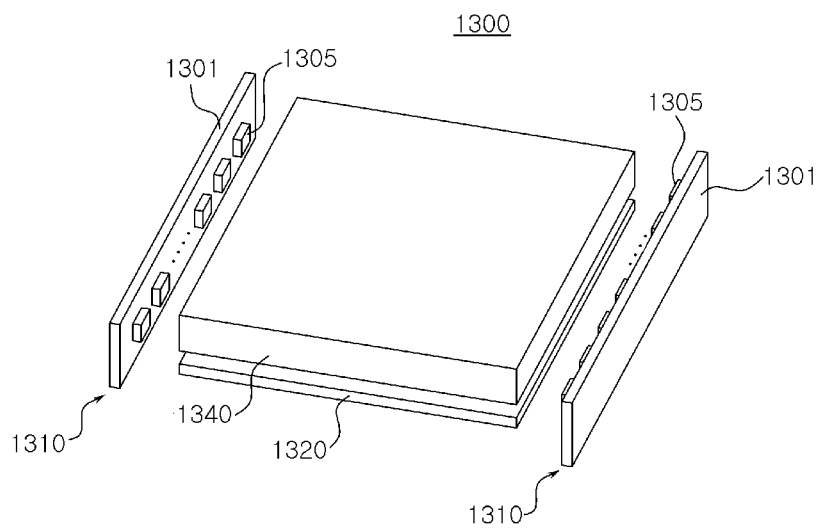
FIGS. 17 and 18 are cross-sectional views of backlight units according to various embodiments of the inventive concept.
Figure 18:
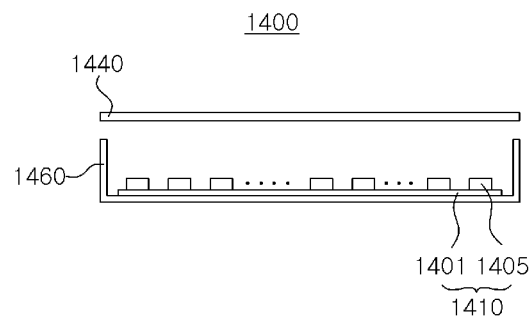

FIGS. 17 and 18 are cross-sectional views of backlight units according to various embodiments of the present inventive concept.

As an example of a backlight unit in which a light emitting diode package according to an embodiment of the inventive concept is applied as a light source, FIG. 17 illustrates an edge-type backlight unit 1300.

The edge-type backlight unit 1300 according to an embodiment of the present inventive concept may include a light guide plate 1340 and an LED light source module 1310 provided on both sides of the light guide plate 1340.

Although the embodiment of FIG. 17 illustrates an example in which the LED light source modules 1310 are provided at opposing both sides of the light guide plate 1340, the LED light source module may only be disposed on a single side thereof, and unlike the description above, additional LED light source modules may also be provided on other sides.

As illustrated in FIG. 17, a reflective plate 1320 may be further provided on a lower part of the light guide plate 1340. The LED light source module 1310 used in the present embodiment may include a printed circuit board 1301 and a plurality of LED light sources 1305 mounted on the board 1301, and the LED light sources 1305 may be provided using a light emitting device package employing the foregoing phosphor, to be applied thereto.

As an example of another-type backlight unit, FIG. 18 illustrates a direct-type backlight unit 1400.

The direct-type backlight unit 1400 according to an embodiment of the present inventive concept may include a light diffusion plate 1440 and LED light source modules 1410 arrayed on a lower surface of the light diffusion plate 1440.

The backlight unit 1400 illustrated in FIG. 18 may include a bottom case 1460 provided with a lower part of the light diffusion plate 1440 and receiving the light source module.

The LED light source module 1410 employed in an embodiment of the present inventive concept may include a plurality of LED light sources 1405 mounted on an upper surface of the substrate 1401. The plurality of LED light sources 1405 may be light emitting device packages using the above-mentioned phosphors as wavelength conversion materials. That is, the plurality of LED light sources 1405 may include a nitride phosphor represented by an empirical formula of $Sr_{1-x-y}Ba_xEu_yAlSi_4N_7$. In this empirical formula, a composition ratio (x) of Ba may satisfy $0 < x \leq 0.3$ and a composition ratio (y) of Eu may satisfy $0 < y \leq 0.1$.

In addition to the embodiments described above, the phosphor may not be directly disposed within a package in which an LED is located, but may be disposed in a different constituent element of the backlight unit to be able to convert light. The embodiments as described above are illustrated in FIGS. 19 to 22.

Figure 19:
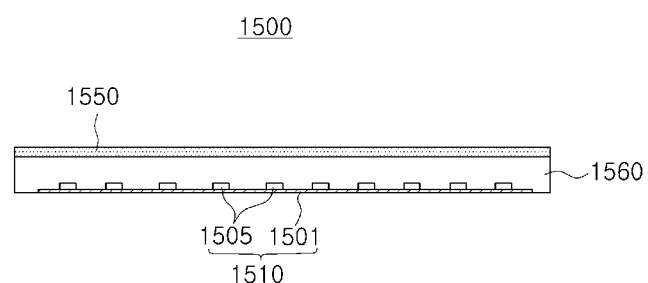
FIG. 19 is a cross-sectional view of a direct-type backlight unit according to an embodiment of the inventive concept.

First, as shown in FIG. 19, a direct-type backlight unit 1500 according to an embodiment of the present inventive concept may include a phosphor film 1550 including the above-mentioned nitride phosphor and an LED light source module 1510 arrayed on a lower surface of the phosphor film 1550.

The backlight unit 1500 illustrated in FIG. 19 may include a bottom case 1560 receiving the light source module 1510, According to an embodiment of the present inventive concept, the phosphor film 1550 may be disposed on an upper surface of the bottom case 1560. A wavelength of at least a portion of light emitted from the light source module 1510 may be varied by the phosphor film 1550. Although the phosphor film 1550 may be manufactured as a separate film to be applied, the phosphor film 1550 may be provided in a form in which it is integrated with the light diffusion plate.

Here, the LED light source module 1510 may include a printed circuit board 1501 and a plurality of LED light sources 1505 mounted on the board 1501.

Figure 20:
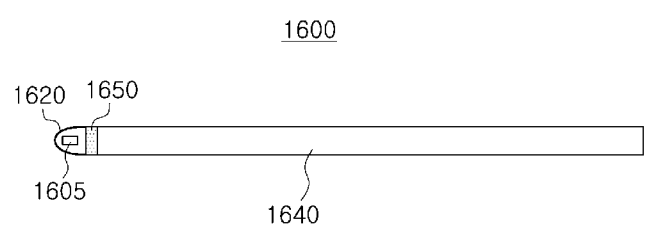
FIGS. 20 and 21 are cross-sectional views of edge-type backlight units according to another embodiment of the inventive concept.
Figure 21:
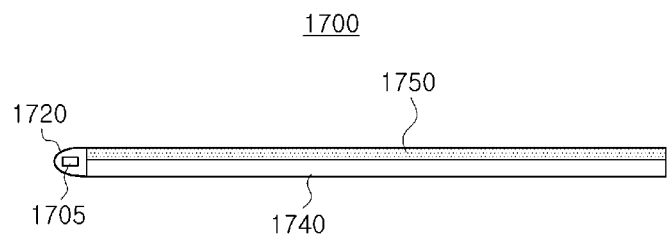

FIGS. 20 and 21 illustrate edge-type backlight units according to embodiments of the inventive concept.

An edge-type backlight unit 1600 shown in FIG. 20 may include a light guide plate 1640 and an LED light source 1605 provided with one side 1620 of the light guide plate 1640. Light from the LED light source 1605 may be guided to the interior of the light guide plate 1640 through a reflective structure. In an embodiment of the present inventive concept, a phosphor film 1650 including the above-mentioned nitride phosphor may be interposed between a side of the light guide plate 1640 and the LED light source 1605.

An edge-type backlight unit 1700 shown in FIG. 21 may include a light guide plate 1740 and an LED light source 1705 and a reflective structure 1720 provided with one side of the light guide plate 1740. The embodiment of FIG. 21 illustrates a form in which a phosphor film 1750 including the above-mentioned nitride phosphor is applied to a light emission surface of the light guide plate 1740.

As described above, the phosphor according to an embodiment of the present inventive concept may also be implemented to be applied to other devices such as a backlight unit or the like instead of being directly applied to the LED light source.

Figure 22:
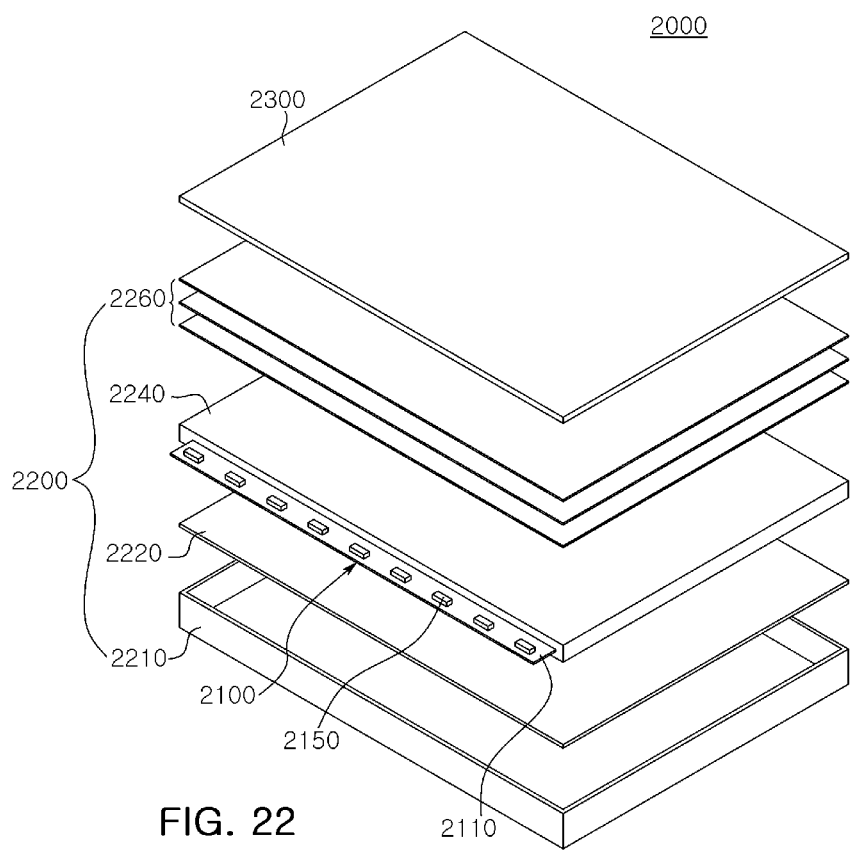
FIG. 22 is an exploded perspective view of a display device according to an embodiment of the inventive concept.

FIG. 22 is an exploded perspective view of a display device according to an embodiment of the present inventive concept.

The display device 2000 shown in FIG. 22 may include a backlight unit 2200 and an image display panel 2300 such as a liquid crystal panel. The backlight unit 2200 may include a light guide plate 2240 and an LED light source module 2100 provided with at least one side of the light guide plate 2240.

In an embodiment of the present inventive concept, the backlight unit 2200 may further include a bottom case 2210 and a reflective plate 2220 disposed below the light guide plate 2240 as shown in FIG. 22.

In addition, according to requirements for various optical characteristics, the display device 2000 may further include several types of optical sheets 2260 such as a diffusion sheet, a prism sheet or a protective sheet between the light guide plate 2240 and the liquid crystal panel 2300.

The LED light source module 2100 may include a printed circuit board 2110 provided with at least one side of the light guide plate 2240 and a plurality of LED light sources 2150 mounted on the printed circuit substrate 2110 to allow light to be incident onto the light guide plate 2240. The plurality of LED light sources 2150 may be the above-mentioned light emitting device packages. The plurality of LED light sources employed in an embodiment of the present inventive concept may be side view-type light emitting device packages of which sides adjacent to a light emission surface are mounted.

As described above, the phosphor according to the present inventive concept may be applied to a package having various mounting structures to be applied to an LED light source module providing various types of white light. The above-mentioned light emitting device package or the above-mentioned light source module including the same may be applied to various types of display devices or illumination apparatuses.

As set forth above, according to an embodiment of the inventive concept, a red phosphor having relatively excellent thermal stability as well as high light emission characteristics may be provided. Properties of a red phosphor proposed according to an embodiment of the present inventive concept may be maintained in a relatively high temperature environment, and thus, may be effectively used as a wavelength conversion material of a semiconductor light emitting device, a relatively high heat radiating source.

While the inventive concept has been shown and described in connection with embodiments, it will be apparent to those skilled in the art that modifications and variations could be made without departing from the spirit and scope of the present inventive concept as defined by the appended claims.

What is claimed is:

1. A red phosphor, comprising:
  a nitride represented by an empirical formula of $Sr_{1-x-y}Ba_xEu_yAlSi_4N_7$; and
  oxygen of 0.5 wt % or less as an impurity,
  wherein a composition ratio (x) of barium (Ba) satisfies $0<x\leq0.3$ and a composition ratio (y) of europium (Eu) satisfies $0<y\leq0.1$.

2. The red phosphor of claim 1, wherein the red phosphor is configured to emit light having a peak wavelength ranging from 600 nm to 660 nm, when an excitation light irradiates onto the red phosphor.

3. The red phosphor of claim 2, wherein internal quantum efficiency of the red phosphor is 80% or more.

4. The red phosphor of claim 2, wherein a half-width of the red phosphor is 110 nm or below.

5. A red phosphor, comprising:
  a nitride represented by an empirical formula of $Sr_{1-x-y}Ba_xEu_yAlSi_4N_7$; and
  at least one metal selected from the group consisting of Fe, Co and Ni, as an impurity, in an amount of 50 ppm or less,
  wherein a composition ratio (x) of barium (Ba) satisfies $0<x\leq0.3$ and a composition ratio (y) of europium (Eu) satisfies $0<y\leq0.1$.

6. The red phosphor of claim 1, wherein the red phosphor has a grain size d50 satisfying $7\mu m \leq d50 \leq 25\mu m$.

7. A white light emitting device, comprising:
  a semiconductor light emitting device configured to emit excitation light;
  a red phosphor according to claim 1, disposed in the vicinity of the semiconductor light emitting device to convert a wavelength of at least a portion of the excitation light; and
  at least one of green and yellow phosphors disposed in the vicinity of the semiconductor light emitting device to convert a wavelength of at least a portion of the excitation light.

8. The white light emitting device of claim 7, wherein:
the semiconductor light emitting device is a blue semiconductor light emitting device having a peak wavelength ranging from 430 nm to 470 nm.

9. The white light emitting device of claim 8, wherein:
a light emission wavelength peak of the red phosphor ranges from 600 nm to 650 nm,
a light emission wavelength peak of the green phosphor ranges from 500 nm to 550 nm, and
a light emission wavelength peak of the yellow phosphor ranges from 550 nm to 580 nm.

10. The white light emitting device of claim 8, wherein the green phosphor includes at least one of an oxide phosphor represented by an empirical formula of $M_3Al_5O_{12}$, an oxynitride phosphor, a β-sialon phosphor, and a phosphor of $La_3Si_6N_{11}$:Ce, M being at least one group II or III element selected from the group consisting of Y, Lu, Gd, Ga, Be, Mg, Ca, Sr, Ba, Zn, Eu, and Ce.

11. The white light emitting device of claim 8, wherein the at least one light emitting element further includes a yellow or yellowish-orange phosphor.

12. The white light emitting device of claim 11, wherein the yellow phosphor is at least one of a silicate-based phosphor, a garnet-based phosphor and a nitride-based phosphor, and the yellowish-orange phosphor is a phosphor of α-SiAlON:Re, wherein Re is at least one from the group consisting of Y, La, Ce, Nd, Pm, Sm, Gd, Tb, Dy, Ho, Er, Tm, Yb, Lu, F, Cl, Br and I.

13. An illumination apparatus, comprising:
an LED light source; and
the red phosphor according to claim 1.

14. A display device, comprising:
an LED light source; and
the red phosphor according to claim 1.

15. A backlight unit, comprising:
an LED light source; and
a phosphor film including:
  a nitride represented by an empirical formula of $Sr_{1-x-y}Ba_xEu_yAlSi_4N_7$; and
  oxygen of 0.5 wt % or less as an impurity,
wherein a composition ratio (x) of barium (Ba) satisfies 0<x≤0.3 and a composition ratio (y) of europium (Eu) satisfies 0<y≤0.1.

16. The backlight unit of claim 15, further comprising:
a light source module including the LED light source; and
a bottom case receiving the light source module,
wherein the phosphor film is disposed on an upper surface of the bottom case.

17. The backlight unit of claim 15, further comprising:
a light guide plate,
wherein the LED light source is disposed on one side of the light guide plate.

18. The backlight unit of claim 17, wherein the phosphor film is interposed between a side of the light guide plate and the LED light source.

19. The backlight unit of claim 17, wherein the phosphor film is disposed on a light emission surface of the light guide plate.

* * * * *